United States Patent
Zhou et al.

(10) Patent No.: US 11,092,151 B2
(45) Date of Patent: *Aug. 17, 2021

(54) SYSTEM AND METHOD FOR CONTROLLING A SYSTEM THAT INCLUDES FIXED SPEED AND VARIABLE SPEED COMPRESSORS

(71) Applicant: TRANE INTERNATIONAL INC., Davidson, NC (US)

(72) Inventors: John Qianghua Zhou, Onalaska, WI (US); Roger Joseph Voorhis, Clarksville, TN (US); Caleb Ryan Joiner, Clarksville, TN (US); Benjamin Hayes, Clarksville, TN (US); James Philip Crolius, La Crosse, WI (US); William Hansen, Coon Valley, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 798 days.

This patent is subject to a terminal disclaimer.

(21) Appl. No.: 15/461,927

(22) Filed: Mar. 17, 2017

(65) Prior Publication Data
US 2017/0191475 A1      Jul. 6, 2017

Related U.S. Application Data

(63) Continuation of application No. 14/244,684, filed on Apr. 3, 2014, now Pat. No. 9,599,118.

(51) Int. Cl.
*F04B 49/06*      (2006.01)
*F04B 27/14*      (2006.01)
(Continued)

(52) U.S. Cl.
CPC ............ *F04B 49/065* (2013.01); *F04B 27/14* (2013.01); *F04B 49/20* (2013.01); *F04C 28/08* (2013.01);
(Continued)

(58) Field of Classification Search
None
See application file for complete search history.

(56) References Cited

U.S. PATENT DOCUMENTS

| | | |
|---|---|---|
| 4,594,858 A | 6/1986 | Shaw |
| 4,748,820 A | 6/1988 | Shaw |

(Continued)

OTHER PUBLICATIONS

Yoo et al. "Design of a Variable Speed Compressor Drive System for Air-Conditioner without Electrolytic Capacitor", 2007 IEEE, pp. 305-310.

(Continued)

*Primary Examiner* — Van H Nguyen
(74) *Attorney, Agent, or Firm* — Hamre, Schumann, Mueller & Larson, P.C.

(57) ABSTRACT

A system and method for controlling a system that includes fixed speed and variable speed compressors are described. The method generally allows the system, for example, a heating, ventilating, and air condition (HVAC) system that includes fixed speed and variable speed compressors, to maximize unit modulating capability. The method allows the use of a variable speed compressor that is relatively smaller, which can lead to cost savings, easier installation, manufacturing, etc.

20 Claims, 7 Drawing Sheets

Related U.S. Application Data

(60) Provisional application No. 61/808,493, filed on Apr. 4, 2013.

(51) Int. Cl.

| | | |
|---|---|---|
| *F04D 27/02* | (2006.01) | |
| *F04B 49/20* | (2006.01) | |
| *F04C 28/08* | (2006.01) | |
| *F04D 27/00* | (2006.01) | |
| *F25B 49/02* | (2006.01) | |

(52) U.S. Cl.
CPC ....... *F04D 27/004* (2013.01); *F04D 27/0269* (2013.01); *F25B 49/022* (2013.01); *F04B 2203/0209* (2013.01); *F04B 2205/11* (2013.01); *F04C 2270/051* (2013.01); *F25B 2400/0751* (2013.01); *F25B 2600/0251* (2013.01); *F25B 2600/0253* (2013.01); *Y02B 30/70* (2013.01)

(56) References Cited

U.S. PATENT DOCUMENTS

| | | | |
|---|---|---|---|
| 4,787,211 A | | 11/1988 | Shaw |
| 4,918,932 A | * | 4/1990 | Gustafson ............... F25B 49/02 |
| | | | 236/78 D |
| 4,947,655 A | | 8/1990 | Shaw |
| 4,951,475 A | | 8/1990 | Alsenz |
| 5,067,326 A | | 11/1991 | Alsenz |
| 5,265,434 A | | 11/1993 | Alsenz |
| 5,440,891 A | * | 8/1995 | Hindmon, Jr. ........ F25B 49/022 |
| | | | 236/78 D |
| 5,570,585 A | * | 11/1996 | Vaynberg ............. F25B 49/022 |
| | | | 62/175 |
| 5,586,444 A | * | 12/1996 | Fung ................... F25B 49/022 |
| | | | 318/610 |
| 5,628,201 A | | 5/1997 | Bahel et al. |
| 5,797,729 A | | 8/1998 | Rafuse et al. |
| 6,679,074 B2 | * | 1/2004 | Hanson ................... F25D 17/06 |
| | | | 62/160 |
| 7,086,250 B2 | | 8/2006 | Ishihara et al. |
| 7,654,104 B2 | | 2/2010 | Groll et al. |
| 8,047,012 B2 | | 11/2011 | Landers et al. |
| 8,287,230 B2 | * | 10/2012 | Hurst, Jr. ............... F04B 49/065 |
| | | | 415/5 |
| 8,297,071 B2 | | 10/2012 | Shioyama et al. |
| 9,239,174 B2 | | 1/2016 | Rockenfeller et al. |
| 9,822,989 B2 | * | 11/2017 | Federspiel ............... F24F 11/00 |
| 2003/0024256 A1 | * | 2/2003 | Hanson ................... F25D 17/06 |
| | | | 62/208 |
| 2005/0244277 A1 | * | 11/2005 | Hurst, Jr. ............... F04B 49/065 |
| | | | 417/216 |
| 2006/0225445 A1 | | 10/2006 | Lifson et al. |
| 2006/0266074 A1 | | 11/2006 | Groll et al. |
| 2007/0022770 A1 | * | 2/2007 | Liu ....................... F25B 49/022 |
| | | | 62/228.1 |
| 2007/0227161 A1 | | 10/2007 | Boer et al. |
| 2007/0289653 A1 | | 12/2007 | Harris et al. |
| 2008/0307813 A1 | * | 12/2008 | Lifson ................... F25B 49/022 |
| | | | 62/228.4 |
| 2009/0277205 A1 | | 11/2009 | Matsuda et al. |
| 2012/0210736 A1 | | 8/2012 | Rockenfeller et al. |
| 2013/0098100 A1 | | 4/2013 | Bonnefoi et al. |
| 2013/0145781 A1 | | 6/2013 | Liu |
| 2013/0151019 A1 | * | 6/2013 | Federspiel ............... F24F 11/00 |
| | | | 700/276 |
| 2014/0130527 A1 | | 5/2014 | Dumas et al. |

OTHER PUBLICATIONS

Ozturk "Experimental Investigation on the Cycle Nature of Pressure Time History in the Compression Chamber of a Domestic Regrigeration Compressor", 2000 IEEE, pp. 3874-3877.

\* cited by examiner

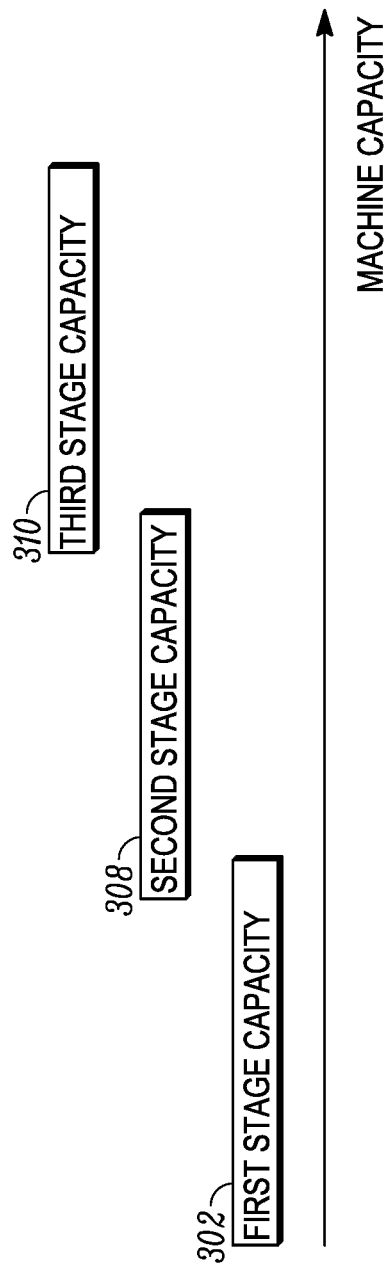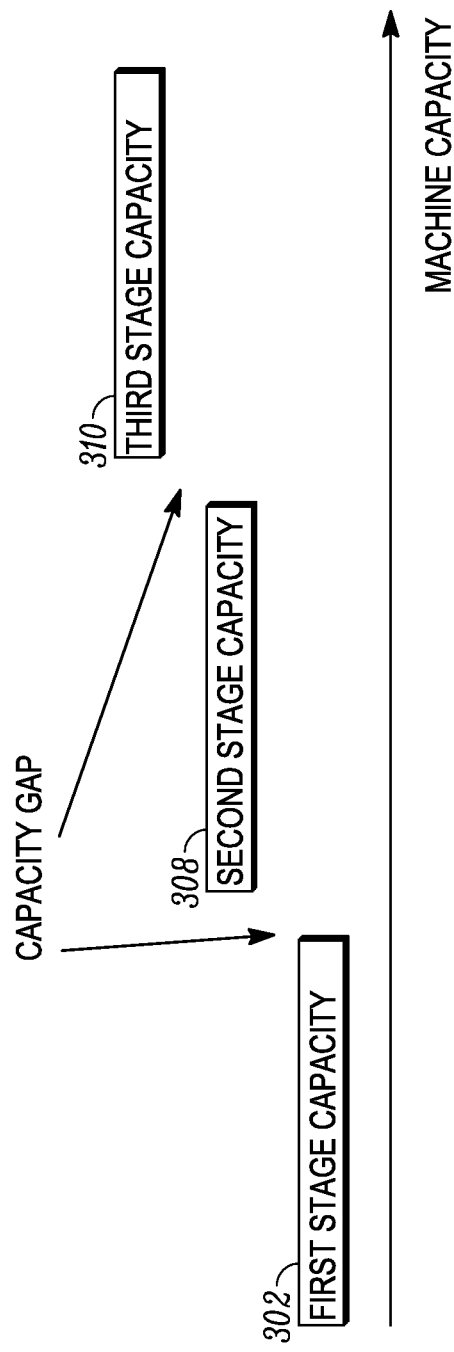

SYSTEM AND METHOD FOR CONTROLLING A SYSTEM THAT INCLUDES FIXED SPEED AND VARIABLE SPEED COMPRESSORS

FIELD

The embodiments disclosed herein relate generally to a system and method for controlling a system that includes fixed speed and variable speed compressors.

BACKGROUND

Control of a compressor utilized in a refrigeration circuit within a refrigeration system is known. Improvements in control of refrigeration systems that include a compressor may be made.

SUMMARY

The embodiments described herein are directed to a system and method for controlling a system that includes a fixed speed compressor and a variable speed compressor. The method generally allows the system, for example, a refrigeration or a heating, ventilating, and air condition (HVAC) system that includes fixed speed and variable speed compressors, to maximize unit modulating capability. The method allows the use of a variable speed compressor that has relatively smaller capacity, which can lead to cost savings, easier installation, manufacturing, etc.

In some embodiments, the system includes one variable speed compressor, at least one fixed speed compressor, a condenser and an evaporator. In some examples, the system can include more than one variable speed compressor. In some examples, the system can further include a control unit that is configured to control the system by executing a control program or algorithm that is stored in a memory of the control unit.

In some examples, the system includes first and second fixed speed compressors, and the control unit is configured so that the fixed speed compressors and the variable speed compressor operate in certain operational stages.

The term "operational stage" means the operational state of each of the compressors. The term "operating mode" refers to a capacity of the compressors operating in a certain operational stage.

The operational state of the fixed speed compressor can be the on state or the off state. The operational state of the variable speed compressor can be the off state, variable speeds ranging from a minimum speed to a maximum speed. In some examples, the operational stages include the following: Stage 0, Stage 1 min, Stage 1 max, Stage 2 min, Stage 2 max, Stage 3 min and Stage 3 max.

At Stage 0, the first and second fixed speed compressors and the variable speed compressor operate in the off state so that the speeds of the fixed speed compressors and the variable speed compressor are at 0 revolutions per second (rps).

At Stage 1 min, the speed of the variable speed compressor ramps up from 0 rps until a minimum speed is reached. In some examples, the speed of the variable speed compressor ramps up at a constant rate and/or a variable rate. In some examples, the ramp rate can be different or the same as that in the other operational stages. For example, the ramp rate in Stage 1 min can be the same as or different from that of Stage 1 max, Stage 2 max, and/or Stage 3 max. In some examples, the ramp rate is predetermined. In some instances, the ramp rate is predetermined based on the type of compressors utilized, e.g., manufacturer, size, etc. of the compressors. The first fixed speed compressor and the second fixed speed compressor operate in the off state so that their speeds are at 0 rps.

At Stage 1 max, the speed of the variable speed compressor can ramp up from the minimum speed to a maximum speed. In some examples, the speed of the variable speed compressor ramps up at a constant rate and/or a variable rate. The first fixed speed compressor and the second fixed speed compressor operate in the off state so that the speeds are at 0 rps.

At Stage 2 min, the first fixed speed compressor operates in the on state and the second fixed speed compressor operates in the off state so that the speed of the second fixed compressor is at 0 rps. The speed of the variable speed compressor is set at or ramped down to a minimum speed. Note that the minimum speed of Stage 2 min can be different from the minimum speed of Stage 1 min.

At Stage 2 max, the first fixed speed compressor operates in the on state and the second fixed speed compressor operates in the off state so that the speed of the second fixed compressor is at 0 rps. The speed of the variable speed compressor ramps up from a minimum speed to a maximum speed. In some examples, the speed of the variable speed compressor ramps up at a constant rate and/or a variable rate. Note that the maximum speed of Stage 2 max can be different from the maximum speed of Stage 1 max.

At Stage 3 min, both the first fixed speed compressor and the second fixed speed compressor operate in the on state. The speed of the variable speed compressor is set at or ramped down to a minimum speed. Note that the minimum speed of Stage 3 min can be different from the minimum speed of Stage 1 min and/or the minimum speed of Stage 2 min.

At Stage 3 max, both the first fixed speed compressor and the second fixed speed compressor operate in the on state. The speed of the variable speed compressor ramps up from a minimum speed to a maximum speed. In some examples, the speed of the variable speed compressor ramps up at a constant rate and/or a variable rate. Note that the maximum speed of Stage 3 max can be different from the maximum speed of Stage 2 max and/or the maximum speed of Stage 2 max.

In some examples, the stages listed above, that is, Stage 0, Stage 1 min, Stage 1 max, Stage 2 min, Stage 2 max, Stage 3 min and Stage 3 max, occur sequentially in the listed order when the load is increasing. In some examples, the stages listed above occur in reverse order when the load is decreasing.

In some examples, the control unit implements an algorithm to control the operation of the compressors. The algorithm generally involves modulating the speed of a variable speed compressor relative to the fixed speed compressors based on a measured parameter and a set point of the measured parameter. In some examples, the control unit implements an algorithm to control the operation of the compressors using a PI controller. In some instances, the algorithm can involve:

(a) measuring a parameter, for example, discharge air temperature (DAT);

(b) determining a PI capacity value based on the parameter measured in (a) and a set point using the PI controller;

(c) determining an operating mode based on the PI capacity value determined in (b);

(d) operating the fixed speed and variable speed compressors based on the determination made in (c);

(e) determining an operating mode after (d);

(f) determining the operational state of the fixed speed compressor;

(g) operating the fixed speed compressor based on the determination made in (f);

(h) determining a speed of the variable speed compressor using the PI controller; and (i) operating the variable speed compressor based on the determination made in (h).

In some examples, in step (c), the PI capacity value is compared to one or more preconfigured values to determine the operating mode, where the operating mode indicates the applicable operational stage(s) based on the determined PI capacity value. In some examples, the preconfigured values are based on the configuration of the system, for example, the type of compressors used, the number of compressors used, etc.

In some instances, the determination made in steps (c) and (e) can depend on whether there is a capacity/stage gap for the variable speed compressor relative to the fixed speed compressors.

In some examples, the ramp rate in the operational stage(s) is limited using the PI controller. In some examples, limiting the ramp rate involves determining a change in speed of the variable speed compressor using the PI controller, comparing the determined change to a predetermined value, and based on the comparison, limiting the ramp rate of the variable speed compressor.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

FIGS. 3A and 3B illustrate the overall concept of the term "capacity/stage gap(s)", according to one embodiment.

DETAILED DESCRIPTION

The embodiments described herein are directed to a system and method for providing control in a system that includes a variable speed compressor and at least one fixed speed compressor. In some examples, the system can include more than one variable speed compressor.

The system can be any system that utilizes a variable speed compressor and one or more fixed sped compressors, including, but not limited to, water source heat pumps, unitary systems, split systems, self-contained systems, outdoor air units and airside, terminal devices and generally any temperature control equipment that utilizes one or more variable speed compressor and one or more fixed speed compressor. Airside and terminal devices include air handlers, make-up air gas heating systems, ventilation fans, blower coil air handlers, HVAC fan coil units, electric wall fins, unit ventilators and variable air volume units.

In some examples, the system can be a large tonnage unit. In some instances, the large tonnage unit has an overall compressor capacity between about 6 to about 12 tons. In some other examples, the system can be a larger tonnage unit. In some instances, the larger tonnage unit has an overall compressor capacity between about 12.5 to about 162.0 tons.

Figure 1:
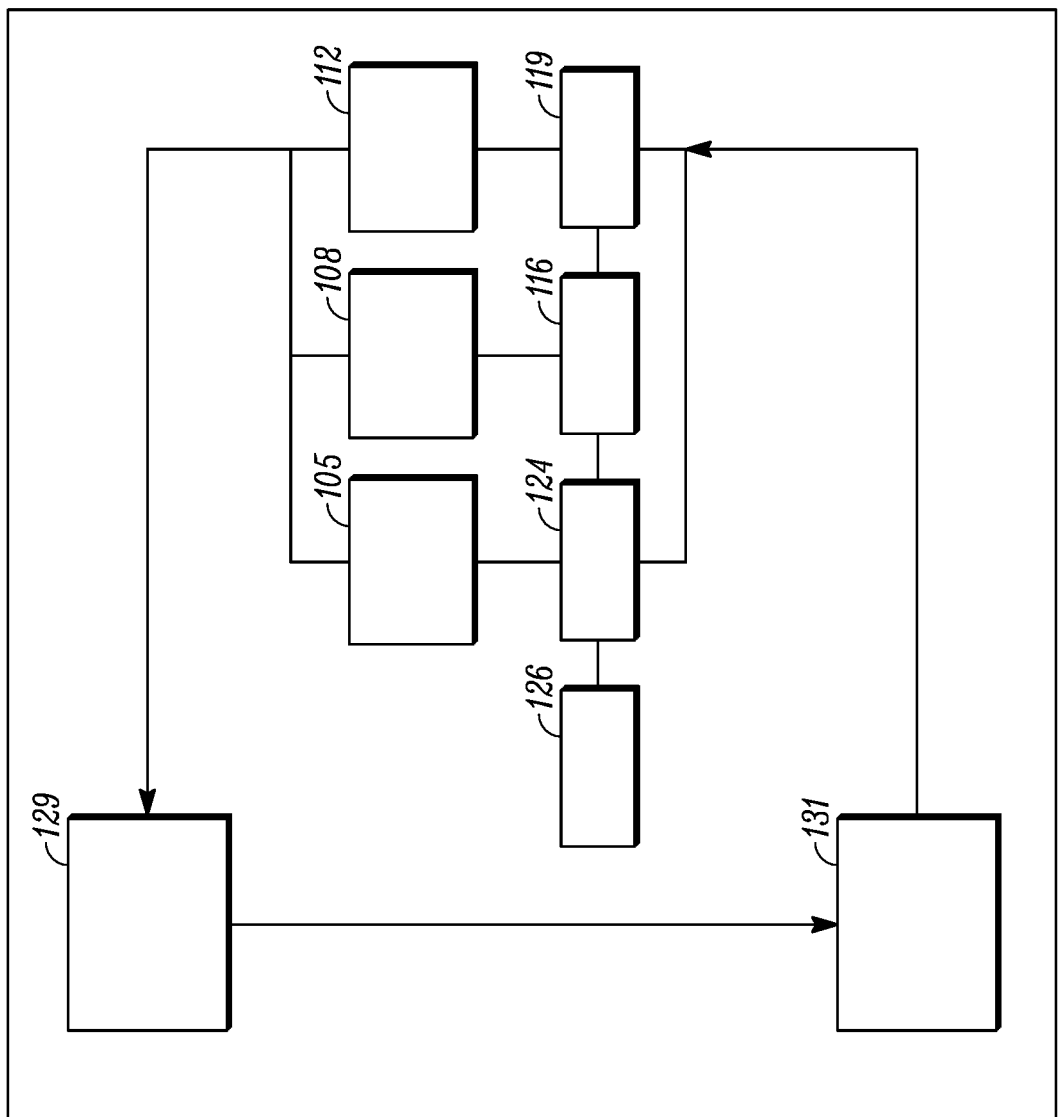
FIG. 1 is a schematic illustration of a system for controlling the operation of fixed speed and variable speed compressors, according to one embodiment.

FIG. 1 provides a schematic illustration of one embodiment of the disclosed system (see system 100 in FIG. 1). The system 100 includes a variable speed compressor 105, a first fixed speed compressor 108 and a second fixed speed compressor 112.

Note that FIG. 1 shows an example of a system including one variable speed compressor 105 and two fixed speed compressors 108 and 112. However, the number of each of the compressors that can be included in the system 100 can be any number that is suitable for use in a refrigeration and/or a HVAC system. Further details of a system that includes more than one variable speed compressor is provided at the end of the Detailed Description below.

The term "fixed speed compressor" means a compressor that operates at a fixed speed. The first fixed speed compressor 108 and the second fixed speed compressor 112 can be connected to motors 116 and 119, respectively, and can be operated as is generally known in the art. The first fixed speed compressor 108 and the second fixed speed compressor 112 can be controlled, for example, by a control unit 121 (note that the control unit 121 will be discussed more in detail below) so that each of the first fixed speed compressor 108 and the second fixed speed compressor 112 operates in the on state or off state. In the on state, each of the first fixed speed compressor 108 and the second fixed speed compressor 112 operates at a fixed speed, e.g., a speed at anywhere between 25 and 100 revolutions per second (rps). In some examples, one or both of the motors 116 and 119 are induction motors. In some instances, one or both of the fixed speed compressors 108 and 112 run on a 60 HZ power supply, and one or both of the fixed speed compressors 108 and 112 operate at a fixed speed of about 60 rps. In the off state, each of the first fixed speed compressor 108 and the second fixed speed compressor 112 operates at 0 rps.

The term "variable speed compressor" means a compressor that operates at variable speeds, as generally understood in the art. The variable speed compressor 105 can be connected to a motor 124 that is driven by a variable speed drive 126, as is generally known in the art. The speed of the variable speed compressor 105 can be controlled, for example, by the control unit 121, so that the variable speed compressor 105 operates at variable speeds, for example, a range of speeds including a minimum speed and a maximum speed. The minimum speed can be, for example, about 25 rps, and the maximum speed can be, for example, 100 rps. Note that these speeds are provided as examples only. In some examples, the minimum speed and/or the maximum speed will depend on the configuration of the system 100 utilized, for instance, the type of variable speed compressor used, the capacity of the variable speed compressor relative to the fixed speed compressors, etc. When the variable speed compressor 105 is turned off, the variable speed compressor 105 operates at 0 rps.

Each of the fixed speed compressors 108 and 112 and the variable speed compressor 105 can be any compressor type that is suitable for use in a refrigeration and/or a HVAC system, and can include, but is not limited to, reciprocating, scroll, rotary, screw, centrifugal, etc.

In some examples, each of the fixed speed compressors 108 and 112 and the variable speed compressor 105 can be in fluid communication with a condenser 129 and a cooling coil 131. The cooling coil 131, the condenser 129 and the compressors 105, 108, and 112 can utilize a refrigeration loop that is generally known in the art. In some instances of the refrigeration loop, the compressors 105, 108, and 112 can feed high-pressure and high-temperature refrigerant gas to the condenser 129. The refrigerant vapor that is delivered to the condenser 129 then can enter into a heat exchange relationship with a fluid, for example, air. In some embodiments, the condensed liquid refrigerant from the condenser 129 then can flow through an expansion device (not shown) to an evaporator (not shown). In some instances, when an evaporator is used, a secondary liquid, e.g., water, that has flowed into the evaporator then can enter into a heat exchange relationship with the low pressure/low temperature liquid refrigerant to chill the temperature of the secondary liquid. The chilled secondary liquid can then run through the cooling coil 131, and the refrigerant liquid in the evaporator can undergo a phase change to a refrigerant vapor as a result of the heat exchange relationship with the secondary liquid. It will be appreciated that if an evaporator is not employed, the cooling coil 131 may act as the evaporator in the system 100. The refrigerant vapor then can return to the compressors 105, 108, and 112 to complete the refrigeration loop.

The system 100 also can include a sensor 135 for measuring a parameter. In some examples, the parameter can be a discharge air temperature (DAT) and/or a space temperature.

The control unit 121 of the system 100 generally can include a processor (not shown), a memory (not shown), a clock (not shown), an input/output (I/O) interface (not shown) and a PI controller (not shown) and can be configured to receive data as input from various components within the system 100, and send command signals as output to various components within the system 100.

In some examples, during operation, the control unit 121 can receive information, for instance, from the first fixed speed compressor 108, the second fixed speed compressor 112, the variable speed compressor 105, and/or the sensor 135 through the I/O interface, process the received information using the processor based on an algorithm stored in the memory, and then send command signals, for instance, to the components involved in the refrigeration loop including the first fixed speed compressor 108, the second fixed speed compressor 112, and/or the variable speed compressor 105.

For example, the control unit 121 can receive information regarding the DAT from the sensor 135, process the data, and then based on the data, send a command signal to the variable speed compressor 105 so as to control the speed of the variable speed compressor 105 and/or send a command signal to the first fixed speed compressor 108 and/or the second fixed speed compressor 112 to control the operation of the respective compressors 108 and 112. It is to be realized that the control unit 121 can be configured to receive information and send command signals to other components that are generally known to be included in a system that utilizes fixed speed and variable speed compressors.

Details of the various algorithms that can be stored in the memory will now be provided below.

Generally, the system 100 is configured so that command signals are sent from the control unit 121 to the fixed speed compressors 108 and 112 and the variable speed compressor 105, and after receiving the command signals, the respective compressors 105, 108 and 112 operate, for example, in the following operational stages: Stage 0, Stage 1 min, Stage 1 max, Stage 2 min, Stage 2 max, Stage 3 min and Stage 3 max. Details of each of the stages are provided below.

At Stage 0, each of the first fixed speed compressor 108, the second fixed speed compressor 112 and the variable speed compressor 105 operates in the off state so that the speed of each of the fixed speed compressors 108 and 112 and the variable speed compressor 105 is at 0 rps.

At Stage 1 min, the speed of the variable speed compressor 105 ramps up from 0 rps until a minimum speed is reached. In some examples, the speed of the variable speed compressor 105 ramps up at a constant rate and/or a variable rate. In one implementation, the constant rate and/or the variable speed is predetermined. In some examples, the constant rate is an increase of about 2 rps. In some examples, the variable rate is a rate that varies between 2 and 4 rps. In other examples, the constant rate and/or the variable rate can be determined based on the configuration of the system 100. In some examples, a PI controller can be used to limit the ramp rate as will be discussed below. The first fixed speed compressor 108 and the second fixed speed compressor 112 operate in the off state so that the speeds are at 0 rps.

At Stage 1 max, the speed of the variable speed compressor 105 can ramp up from a minimum speed to a maximum speed. In some examples, the speed of the variable speed compressor 105 ramps up at a constant rate and/or a variable rate. In one implementation, the constant rate and/or the variable speed is predetermined. In some examples, the constant rate is an increase of about 2 rps. In some examples, the variable rate is a rate that varies between 2 and 4 rps. In other examples, the constant rate and/or the variable rate can be determined based on the configuration of the system 100. In some examples, a PI controller can be used to limit the ramp rate as described below. The first fixed speed compressor 108 and the second fixed speed compressor 112 operate in the off state so that the speeds are at 0 rps.

At Stage 2 min, the first fixed speed compressor 108 operates in the on state and the second fixed speed compressor 112 operates in the off state so that the speed of the second fixed compressor is at 0 rps. The speed of the variable speed compressor 105 is set at a minimum speed.

At Stage 2 max, the first fixed speed compressor 108 operates in the on state and the second fixed speed compressor 112 operates in the off state so that the speed of the second fixed compressor is at 0 rps. The speed of the variable speed compressor 105 ramps up from a minimum speed to a maximum speed. In some examples, the speed of the variable speed compressor 105 ramps up at a constant rate and/or a variable rate. In one implementation, the constant rate and/or the variable speed is predetermined. In some examples, the constant rate is an increase of about 2 rps. In some examples, the variable rate is a rate that varies between 2 and 4 rps. In other examples, the constant rate and/or the variable rate can be determined based on the configuration of the system 100. In some examples, a PI controller can be used to limit the ramp rate as will be discussed below.

At Stage 3 min, both the first fixed speed compressors 108 and the second fixed speed compressor 112 operate in the on state. The speed of the variable speed compressor 105 is set at a minimum speed.

At Stage 3 max, both the first fixed speed compressor 108 and the second fixed speed compressor 112 operate in the on state. The speed of the variable speed compressor 105 ramps up from a minimum speed to a maximum speed. In some examples, the speed of the variable speed compressor 105 ramps up at a constant rate and/or a variable rate. In one implementation, the constant rate and/or the variable speed is predetermined. In some examples, the constant rate is an increase of about 2 rps. In some examples, the variable rate is a rate that varies between 2 and 4 rps. In other examples, the constant rate and/or the variable rate can be determined based on the configuration of the system 100. In some examples, a PI controller can be used to limit the ramp rate as will be discussed below. In some instances, Stage 3 max is the full capacity for the exemplary set of compressors 105, 108 and 112.

In some examples where the PI controller is used to limit the ramp rate, limiting the ramp rate involves determining a change in speed of the variable speed compressor using the PI controller, comparing the determined change to a predetermined value, and based on the comparison, limiting the ramp rate of the variable speed compressor. The predetermined value can be, e.g., 2 rps. In some example, if the determined change is greater than a predetermined value where the load is increasing, the ramp rate is limited to the predetermined value. Otherwise, the ramp rate may not be limited. In some examples, if the determined change is less than a predetermined value where the load is decreasing, the ramp rate is limited to the predetermined value. Otherwise, the ramp rate may not be limited.

In some examples, the minimum speed and/or the maximum speed of the variable speed compressor 105 for each of the respective stages can be different from or the same as one another. For instance, the minimum speed of the variable speed compressor 105 in Stage 1 min can be different from or the same as that of Stage 2 min and/or Stage 3 min. Likewise, the maximum speed of the variable speed compressor 105 in Stage 1 max can be different from or same as that of Stage 2 max and/or Stage 3 max. In some instances, the minimum speed and maximum speed selection is a tradeoff among, for example, factors including cost, energy efficiency and acoustics. In some other examples, the minimum speed and/or maximum speed is (are) predetermined for the selected variable speed compressor 105. For instance, the minimum speed and/or maximum speed is (are) predetermined based on the size and model of the variable speed compressor 105 utilized. In some examples, the algorithm described below utilizes the minimum speed and/or maximum speed to normalize dynamic behavior of the system 100.

In some examples, the operational stages listed above, that is, Stage 0, Stage 1 min, Stage 1 max, Stage 2 min, Stage 2 max, Stage 3 min and Stage 3 max, can occur sequentially in the listed order when the load is increasing. Note that the compressors are not required to operate in all of the operational stages. That is, the system 100 is capable of modulating between the operational stages so that the compressors operate in only a subset of the listed operational stages. The subset of the operational stages in which the compressors 105, 108 and 112 operate can be determined by an algorithm, for example the algorithm that is discussed in detail below.

In some examples, the operational stages listed above can occur in reverse order when the load is decreasing, for example, in the following sequential order: Stage 3 max, Stage 3 min, Stage 2 max, Stage 2 min, Stage 1 max, Stage 1 min and Stage 0.

Figure 2A:
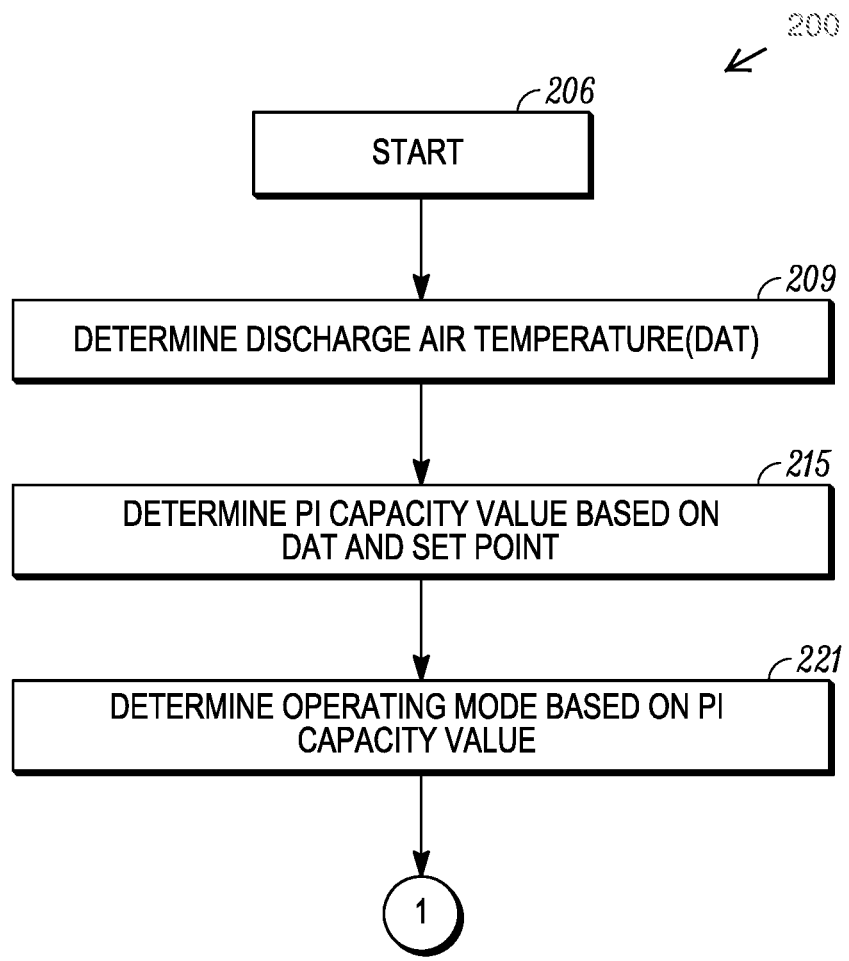
FIGS. 2A-2C are flow charts of the processes involved in controlling the fixed speed and variable speed compressors, according to one embodiment.
Figure 2B:
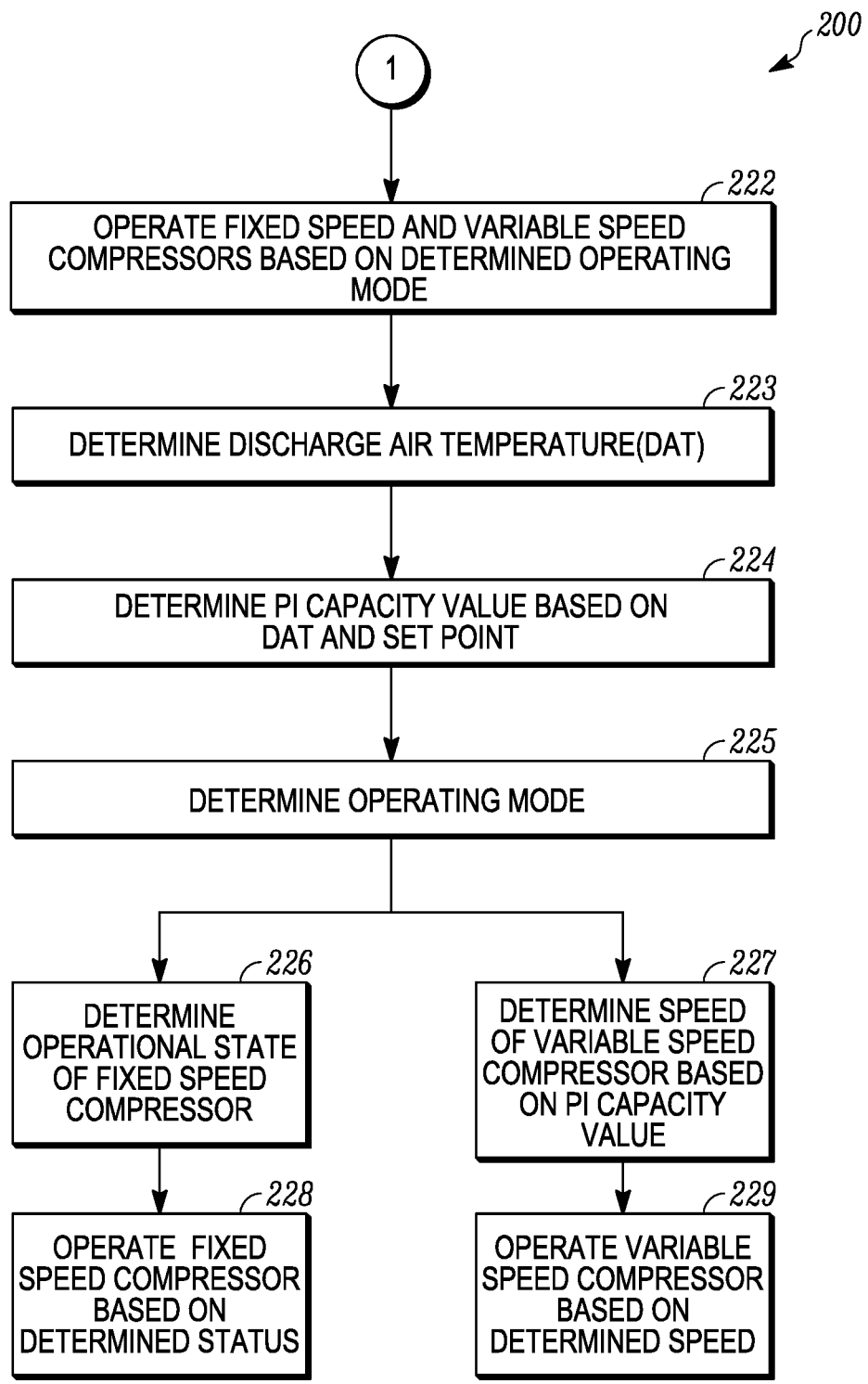
Figure 2C:
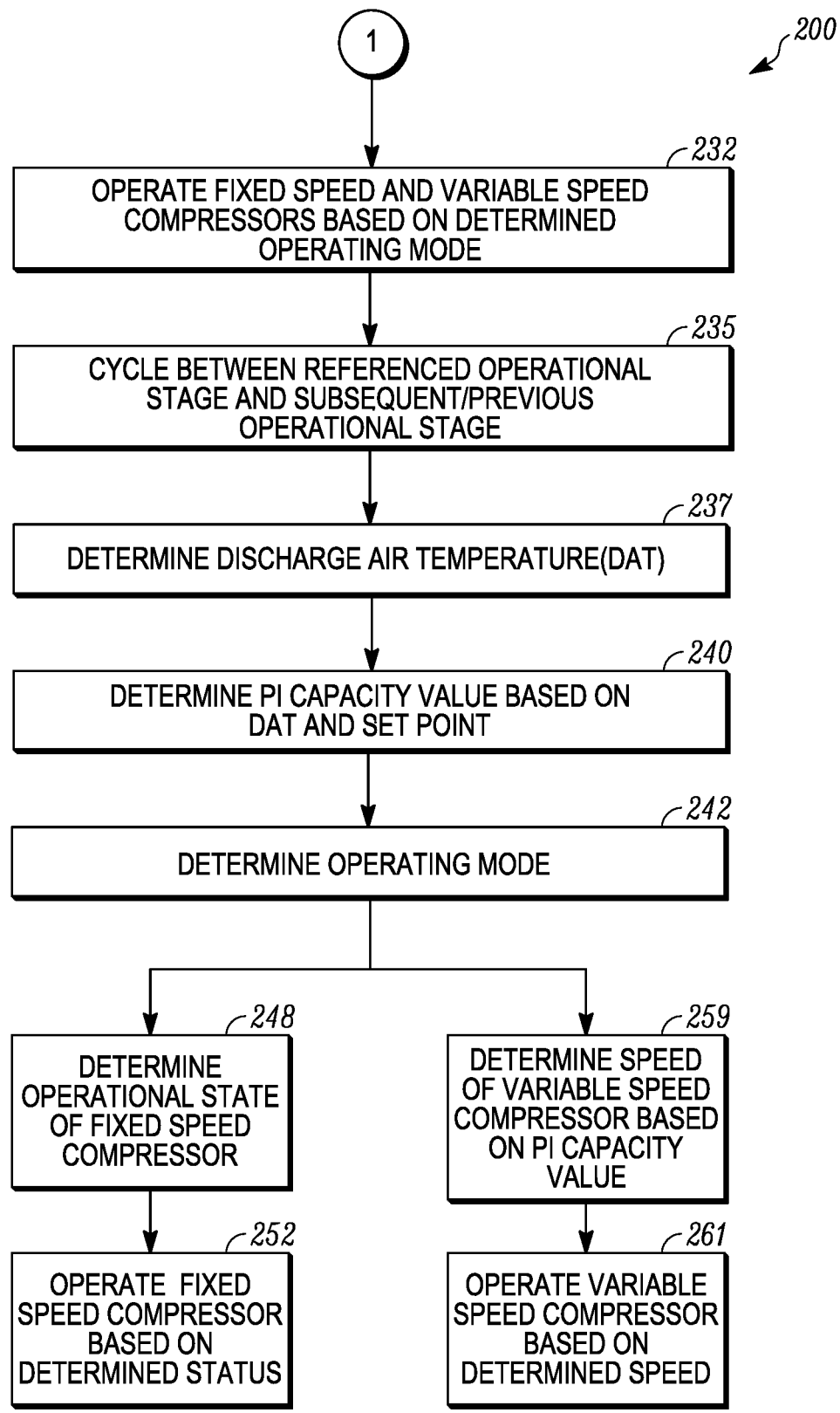

Generally, the control unit 121 can be configured to implement the disclosed method of controlling the system 100 as illustrated in FIGS. 2A-2C. In general, the process described in FIGS. 2A-2C is executed by the processor executing program instructions (algorithm(s)) stored in the memory of the control unit 121.

With reference to FIG. 2A, in one embodiment, the disclosed method or algorithm 200 initiates at step 206 and proceeds to step 209 where a determination is made as to a parameter using the sensor 135. In some examples, the parameter can be space temperature. In some other examples, the parameter can be discharge air temperature (DAT). In the description that follows, the algorithm 200 will be described using DAT as the parameter. However, it is to be realized that the space temperature can replace the DAT in the description that follows.

After step 209, the algorithm 200 proceeds to 215 where a determination is made as to a PI capacity value using the PI controller. In some examples, the PI capacity value is determined based on the DAT measured in step 209 and a set point of the DAT. In some examples, the PI capacity value can be determined, for example, by applying a gain value to the difference between the measured DAT and the set point. In some examples, the gain value can be adjusted, for example, by considering the supply air flow across an evaporator coil. In some instances, the PI controller has a deadband of about 0.5 to about 1° F. so that when the DAT is about 0.5 to about 1° F. above the set point, the algorithm 200 continues, and when the DAT is about 0.5 to about 1° F. below the set point, the algorithm 200 ends. In some instances, a wider deadband can be used at Stage 0 to Stage 1 min to minimize cycling. Note that cycling refers to the cycling step 235 in FIG. 2C, which will be discussed in further detail below.

After step 215, a determination is made as to an operating mode based on the PI capacity value at 221. The operating mode is a parameter that is used by the algorithm 200 to indicate the applicable operational stage(s) based on the determined PI capacity value. In some examples, the operating mode is determined by comparing the PI capacity value with preconfigured values, for example, using a lookup table. In some examples, the operating mode is determined by normalizing the PI capacity value based on the configuration of the system 100. In some examples, the preconfigured values are based on the configuration of the system, for example, the type of compressors used, the number of compressors used, etc.

In some examples, the type of parameters used for the operating mode depends on whether there is(are) capacity/stage gap(s) for the variable speed compressor 105 relative to the fixed speed compressors 108 and 112.

The meaning of "capacity/stage gap(s)" will now be described with reference to FIGS. 3A and 3B. FIGS. 3A and 3B illustrate the overall concept of the term "capacity/stage gap(s)". The term "capacity/stage gap(s)" generally refers to the gap in capacity of the variable speed compressor 105 relative to the fixed speed compressors 108 and 112. The term "capacity" means the tons the compressor will produce based on certain operating conditions.

Generally, the "capacity/stage gap(s)" concept illustrates how the algorithm 200 modulates the operation of the fixed speed compressors 108 and 112 and the variable speed compressor 105 based on the configuration of the system 100. The modulation of the operation of the fixed speed compressors 108 and 112 and the variable speed compressor 105 can be done by adjusting the speed of the variable speed compressor 105 and/or by a cycling operation to meet a set point of the PI controller.

Each of a first stage capacity box 302, a second stage capacity box 308 and a third stage capacity box 310 in FIGS. 3A and 3B indicates a capacity range of the variable speed compressor 105 under different operating states of the variable speed compressor 105 and the first fixed speed compressor 108 and the second fixed speed compressor 112. In particular, the first stage capacity box 302 indicates a capacity range 305 of the variable speed compressor 105 when both the first fixed speed compressor 108 and the second fixed speed compressor 112 are turned off. The second stage capacity box 308 indicates a capacity range 309 of the variable speed compressor 105 when the variable speed compressor 105 is operating between a minimum speed and a maximum speed, and the first fixed speed compressor 108 is turned on and the second fixed speed compressor 112 is turned off. The third stage capacity box 310 indicates a capacity range 312 of the variable speed compressor 105 when the variable speed compressor 105 is operating between a minimum speed and a maximum speed, and both the first fixed speed compressor 108 and the second fixed speed compressor 112 are turned on.

Referring to FIG. 3A, in some examples, there is no capacity/stage gap when a maximum capacity of the capacity range in one stage overlaps a minimum capacity of the capacity range in the subsequent stage. In some examples, an overlapping region of the maximum capacity of the capacity range in one stage and the minimum capacity of the capacity range in the subsequent stage is about 2 to about 3%. In some examples, there is no capacity/stage gap if a maximum capacity 302 max of the capacity range 305 in the first stage capacity box 302 overlaps a minimum capacity 308 min of the capacity range 309 in the second stage capacity box 308 and/or if a maximum capacity 308 max of the capacity range 309 in the second stage capacity box 308 overlaps a minimum capacity 310 min of the capacity range 312 in the third stage capacity box 310 as shown in FIG. 3A.

Referring to FIG. 3B, on the other hand, a capacity/stage gap is present when a maximum capacity of the capacity range in one stage does not overlap a minimum capacity of the capacity range in the subsequent stage. In particular, there is a capacity/stage gap 315 if the maximum capacity 302 max of the capacity range 305 in the first stage capacity box 302 does not overlap the minimum capacity 308 min of the capacity range 309 in the second stage capacity box 308 and/or if the maximum capacity 308 max of the capacity range 309 in the second stage capacity box 308 does not overlap the minimum capacity 310 min of the capacity range 312 in the third stage capacity box 310 as shown in FIG. 3B.

Generally, the presence or absence of the capacity/stage gap depends on the configuration of the system 100, for instance, the type of variable speed compressor 105 utilized. For example, a capacity/stage gap may occur in systems where the variable speed compressor 105 has a small capacity relative to the fixed speed compressors 108 and 112. In general, in the instance where the capacity/stage gap is present, the algorithm 200 will modulate the operation of the fixed speed compressors 108 and 112 and the variable speed compressor 105 by using a cycling operation, whereas in the instance where the capacity/stage gap is absent, the algorithm 200 will not use a cycling operation.

Details of Algorithm where there is No Capacity/Stage Gap

Referring back to FIG. 2A, in some examples, if there is no capacity/stage gap, that is, where a capacity/stage overlap is present, then the parameters used for the operating mode in the algorithm 200 include Stage 1 min capacity, Stage 1 max capacity and Stage 2 max capacity.

Figure 4:
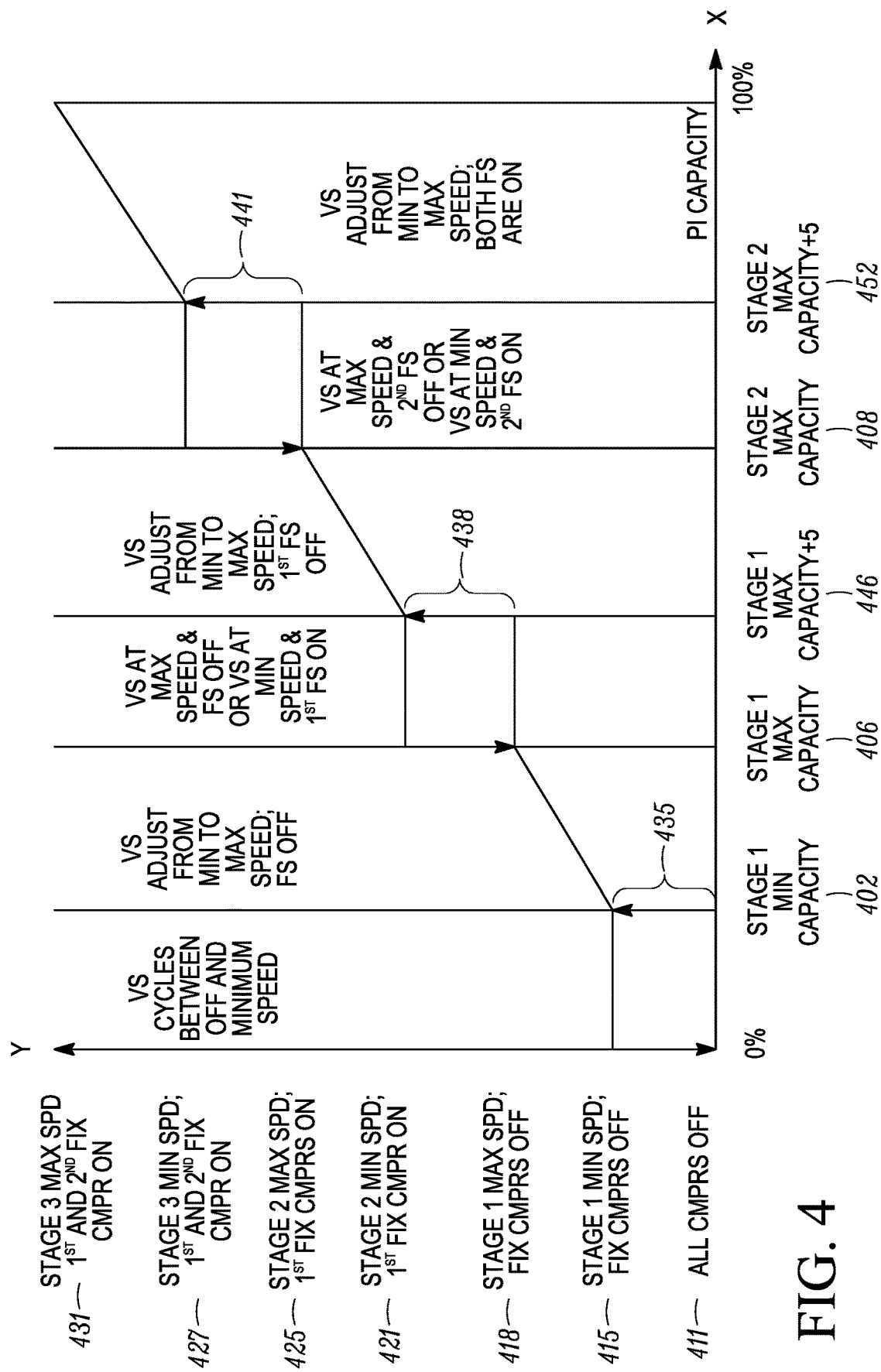
FIG. 4 shows a graph of the relation between the operating modes and operational stages where there is no capacity/stage gap, i.e., where a capacity/stage overlap, according to one embodiment.

FIG. 4 shows a graph illustrating the overall relation between the operating modes on the x-axis, namely, Stage 1 min capacity 402, Stage 1 max capacity 406 and Stage 2 max capacity 408, and the operational stages on the y-axis, namely, Stage 0 411, Stage 1 min 415, Stage 1 max 418, Stage 2 min 421, Stage 2 max 425, Stage 3 min 427 and Stage 3 max 431.

Referring to FIG. 4, Stage 1 min capacity 402 on the x-axis references the unit capacity when the variable speed compressor 105 is operating at Stage 1 min 415 on the y-axis, where both the first fixed speed compressor 108 and the second fixed speed compressor 112 are turned off; Stage 1 max capacity 406 on the x-axis references the unit capacity when the variable speed compressor 105 is operating at Stage 1 max 418 on the y-axis, where both the first fixed speed compressor 108 and the second fixed speed compressor 112 are turned off; and Stage 2 max capacity 408 on the x-axis references the unit capacity when the variable speed compressor 105 is operating at Stage 2 max 425 on the y-axis, where the first fixed speed compressor 108 is turned on and the second fixed speed compressor 112 is turned off.

Referring to FIG. 2A and FIG. 2B, after the operating mode has been determined at 221 as shown in FIG. 2A, the algorithm proceeds to the steps in ①. Details of ① are provided in FIG. 2B.

The steps in ① now will be described with reference to FIG. 2B. At 222, the variable speed compressor 105, the first fixed speed compressor 108 and/or the second fixed speed compressor 112 operate at the referenced operational stage based on the operating mode determined in 221.

Then, at 223, a determination is made as to the DAT, and at 224, a determination is made as to a PI capacity value using the PI controller. In some examples, the PI capacity value is determined based on the DAT measured in step 223 and the set point of the DAT.

The algorithm 200 then proceeds to 225, where a determination is made as to an operating mode based on the PI capacity value determined at 224. In some instances, the parameters used for the operating mode can further include Stage 1 max cap+5 and Stage 2 max cap+5. In some examples, Stage 1 max cap+5 and Stage 2 max cap+5 are used as dynamic buffers to prevent cycling between the referenced operating stage and a previous operating stage. Note that "+5" indicates a 5% differential in the PI capacity values for the respective operating modes, and references a dynamic buffer value. Note also that "+5" is only an example, and can be other values, for example, 0 to 20.

The meaning of "dynamic buffer" will be described with reference to FIG. 4. As illustrated in FIG. 4, Stage 1 max capacity+5 446 on the x-axis references the unit capacity when the variable speed compressor 105 is operating at Stage 2 min 421 on the y-axis, where the first fixed speed compressor 108 is turned on and the second fixed speed compressor 112 is turned off, and Stage 2 max capacity+5 452 on the x-axis references the unit capacity when the variable speed compressor 105 is operating at Stage 3 min 427 on the y-axis, where the first fixed speed compressor 108 is turned on and the second fixed speed compressor 112 is turned on.

In the instance where the PI capacity value determined in 224 is within a dynamic buffer value and the operating mode is determined to be, for example, Stage 1 max cap+5 446 on the x-axis, cycling does not occur between Stage 2 min 421 and Stage 1 max 418 in the region 438 on the y-axis. If, for example, the operating mode is determined to be Stage 2 max cap+5 452, cycling does not occur between Stage 3 min 427 and Stage 2 max 425 in the region 441 on the y-axis. If the operating mode is determined to be Stage 1 min capacity 402, cycling does not occur between Stage 1 min 415 and Stage 0 411 in the region 435 on the y-axis.

Referring back to FIG. 2B, after step 225, a determination is made as to the operational state of the first fixed speed compressor 108 and/or the second fixed speed compressor 112 at 226. A determination is also made as to the speed of the variable speed compressor 105 based on the PI capacity value at 227. Then, at 228, the first fixed speed compressor 108 and/or the second fixed speed compressor 112 is operated based on the determination made in 226, and at 229, the variable speed compressor 105 is operated based on the determination made in 227.

Details of Algorithm in the Presence of Capacity/Stage Gap

Figure 5:
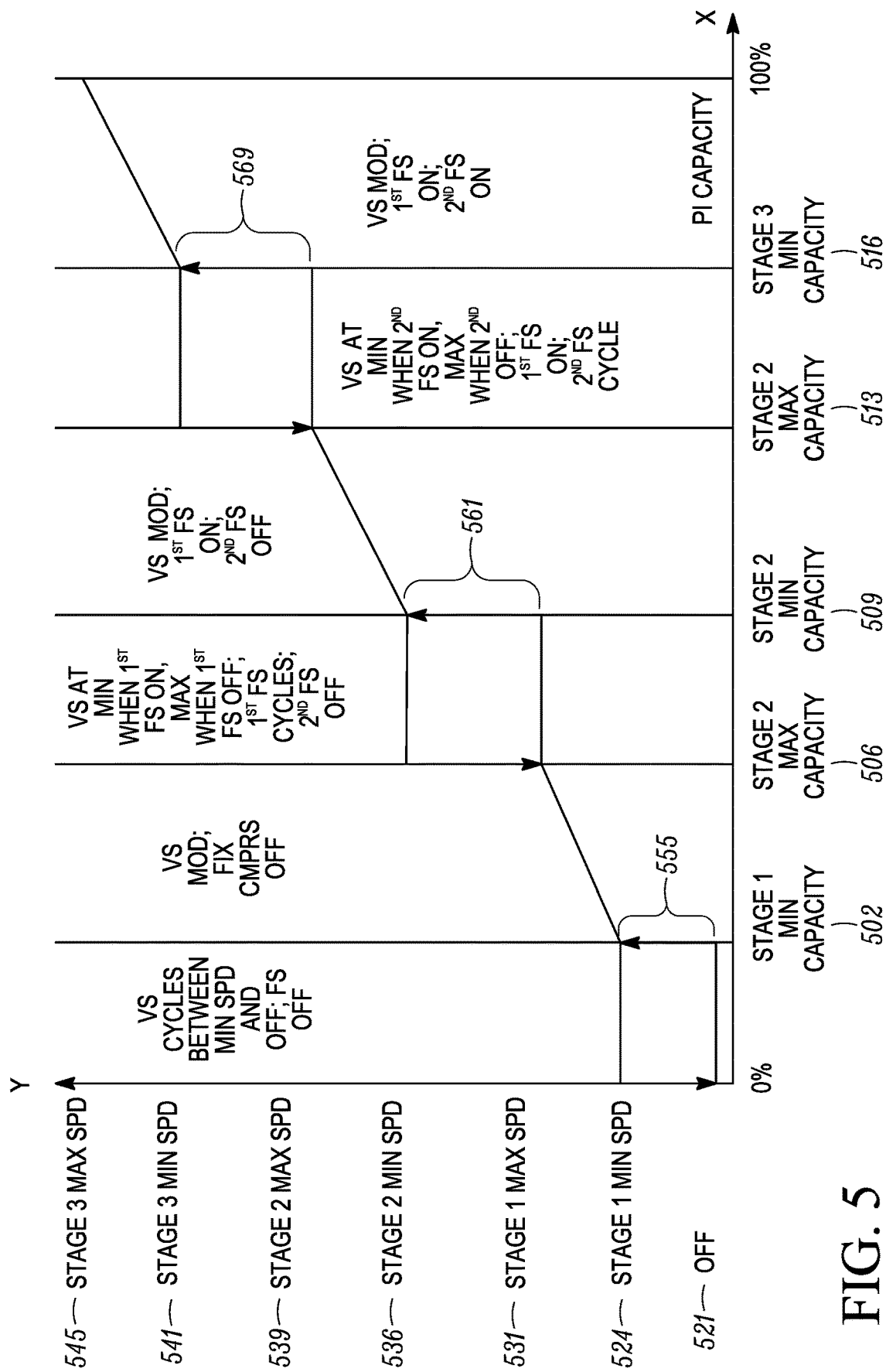
FIG. 5 shows a graph of the relation between the operating modes and operational stages where there is a capacity/stage gap, according to one embodiment.

In some examples, if a capacity/stage gap is present, then the parameters used for the operating mode in the algorithm 200 include Stage 1 min capacity, Stage 1 max capacity, Stage 2 min capacity, Stage 2 max capacity and Stage 3 min capacity. FIG. 5 shows a graph illustrating the overall relation between the operating modes, namely, Stage 1 min capacity 502, Stage 1 max capacity 506, Stage 2 min capacity 509, Stage 2 max capacity 513 and Stage 3 min capacity 516, and the operational stages, namely, Stage 0 521, Stage 1 min 524, Stage 1 max 531, Stage 2 min 536, Stage 2 max 539, Stage 3 min 541 and Stage 3 max 545. The operating modes are provided on the x-axis, while the operational stages are provided on the y-axis.

Referring to FIG. 5, Stage 1 min capacity 502 references the unit capacity when the variable speed compressor 105 is operating at Stage 1 min 524, where both the first fixed speed compressor 108 and the second fixed speed compressor 112 are turned off; Stage 1 max capacity 506 references the unit capacity when the variable speed compressor 105 is operating at Stage 1 max 531, where both the first fixed speed compressor 108 and the second fixed speed compressor 112 are turned off; Stage 2 min capacity 509 references the unit capacity when the variable speed compressor 105 is operating at Stage 2 min 536 where the first fixed speed compressor 108 is turned on and second fixed speed compressor 112 is turned off; Stage 2 max capacity 513 references the unit capacity when the variable speed compressor 105 is operating at Stage 2 max 539, where the first fixed speed compressor 108 is turned on and the second fixed speed compressor 112 is turned off; and Stage 3 min capacity 516 references the unit capacity when the variable speed compressor 105 is at Stage 3 min 541 and both the first fixed speed compressor 108 and the second fixed speed compressor 112 are turned on.

Referring to FIGS. 2A and 2C, after the operating mode has been determined at 221, the algorithm proceeds to the steps in ①. Details of ① are provided in FIG. 2C.

The steps in ① now will be described with reference to FIG. 2C. At 232, the variable speed compressor 105, the first fixed speed compressor 108 and/or the second fixed speed compressor 112 operate at the referenced operational stage based on the operating mode determined in 221.

Then, the algorithm proceeds to 235 where the variable speed compressor 105, the first fixed speed compressor 108 and/or the second fixed speed compressor 112 cycle between the referenced operational stage and a subsequent or previous operational stage.

Generally, the reason cycling occurs in the presence of capacity/stage gap is explained as follows with reference to FIG. 5. During operation, the system 100 can have too much cooling if running at, for example, Stage 2 min 536. In this instance, the DAT will become lower than the set point of the DAT, and as a result, the PI capacity value will decrease. When PI capacity value becomes less than, for example, Stage 1 max 531, cycling will occur between Stage 1 max 531 and Stage 2 min 536 in the region 561 on the y-axis.

Further details of the cycling operation will be described with reference to FIG. 5. Cycling can occur between Stage 0 521 and Stage 1 min 524 so that the variable speed compressor 105 cycles between the off state and a minimum speed as shown by region 555 on the y-axis. Cycling also can occur between Stage 1 max 531 and Stage 2 min 536 so that the variable speed compressor 105 cycles between a minimum and a maximum speed and the first fixed speed compressor 108 cycles between the on and off states as shown by region 561 on the y-axis. Cycling also can occur between Stage 2 max 539 and Stage 3 min 541 so that the variable speed compressor 105 cycles between a minimum and a maximum speed and the first fixed speed compressor 108 cycles between the on and off state as shown by region 569 in the y-axis.

In some examples, the variable speed compressor 105, the first fixed speed compressor 108 and/or the second fixed speed compressor 112 cycle a predetermined number of times, for example, 1-5 times. In other examples, the number of the times the variable speed compressor 105, the first fixed speed compressor 108 and/or the second fixed speed compressor 112 cycle between the respective operational stages can depend on the PI capacity value.

Referring back to FIG. 2C, after step 235, the algorithm 200 proceeds to 237 where a determination is made as to the DAT. Then, at 240, a determination is made as to the PI capacity value based on the DAT determined in 237 and the set point of the DAT. Then, at 242, a determination is made as to the operating mode.

Referring to FIG. 2C, after step 242, a determination is made as to the operational state of the first fixed speed compressor 108 and/or the second fixed speed compressor 112 at 248. A determination is also made as to the speed of the variable speed compressor 105 based on the PI capacity value at 259. Then, at 252, the first fixed speed compressor 108 and/or the second fixed speed compressor 112 is operated based on the determination made in 248, and at 261, the variable speed compressor 105 is operated based on the determination made in 259.

In the above-described examples, a system including two fixed speed compressors and one variable speed compressor is described. However, in some examples, the system 100 can include more than one variable speed compressor. In one implementation, one of the fixed speed compressors 108, 112 can be replaced with a variable speed compressor so that the system includes two variable speed compressors and one fixed speed compressor. The algorithm utilized in a system including two variable speed compressors and one fixed speed compressor would be the same as the algorithm 200 discussed above, except that one of the fixed speed compressors 108, 112 would be replaced with a variable speed compressor, and the variable speed compressor replacing one of the fixed speed compressors 108, 112 would switch between speeds rather than turning on and off.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method of controlling operation of a variable speed compressor and a fixed speed compressor in a refrigeration or a heating, ventilating, and air conditioning (HVAC) system, the method comprising:
measuring a parameter;
determining a set point of the measured parameter;
determining a first operating mode based on the measured parameter and the set point;
operating the variable speed compressor and the fixed speed compressor based on the determined first operating mode;
determining a second operating mode;
modulating, by a controller, a speed of the variable speed compressor relative to the fixed speed compressor based on the measured parameter and the set point; and
maintaining the parameter within about 1° F. above the set point and about 1° F. below the set point.

2. The method according to claim 1, wherein the parameter is maintained within about 0.5 to about 1° F. above the set point and within about 0.5 to about 1° F. below the set point.

3. The method according to claim 1, wherein the fixed speed compressor includes a plurality of fixed speed compressors that include a first fixed speed compressor and a second fixed speed compressor.

4. The method according to claim 3, further comprising operating the first fixed speed compressor, the second fixed speed compressor, and the variable speed compressor at one of a plurality of operational stages, the plurality of operational stages being different, the plurality of operational stages corresponding to an operational state.

5. The method according to claim 4, wherein the plurality of operational stages include a first operational stage and a second operational stage, wherein a portion of the first operational stage and a portion of the second operational stage overlap.

6. The method according to claim 5, wherein the overlap provides a continuous capacity control having no stage gap between the plurality of stages.

7. The method according to claim 5, wherein the overlap is set based on a dynamic buffer value expressed as a percentage.

8. The method according to claim 7, wherein the overlap is represented by the first operational stage plus the dynamic buffer value representing a higher capacity than a minimum capacity in the second operational stage.

9. A method of controlling operation of a variable speed compressor, a first fixed speed compressor, and a second fixed speed compressor in a refrigeration or a heating, ventilating, and air conditioning (HVAC) system, the method comprising:
measuring a parameter;
determining a set point of the parameter;
determining a first operating mode based on the measured parameter and the set point;
operating the variable speed compressor, the first fixed speed compressor, and the second fixed speed compressor based on the determined first operating mode;
determining a second operating mode;
modulating, by a controller, a speed of the variable speed compressor relative to the fixed speed compressors based on the measured parameter and the set point;
operating the first fixed speed compressor, the second fixed speed compressor, and the variable speed compressor at one of a plurality of operational stages, the plurality of operational stages being different, and corresponding the plurality of operational stages to an operational state,
wherein the plurality of operational stages include a first operational stage and a second operational stage,
wherein a portion of the first operational stage and a portion of the second operational stage overlap,
wherein the overlap provides a continuous capacity control having no stage gap between the plurality of stages.

10. The method according to claim 9, wherein the overlap is set based on a dynamic buffer value expressed as a percentage.

11. The method according to claim 10, wherein the overlap is represented by the first operational stage plus the dynamic buffer value representing a higher capacity than a minimum capacity in the second operational stage.

12. The method according to claim 9, wherein the measured parameter includes a discharge air temperature, and the discharge air temperature is maintained within about 1° F. above the set point and about 1° F. below the set point.

13. The method according to claim 12, wherein the discharge air temperature is maintained within about 0.5 to about 1° F. above the set point and within about 0.5 to about 1° F. below the set point.

14. A system, comprising:
a variable speed compressor;
a fixed speed compressor;
and a controller, wherein the controller:
measures a discharge air temperature;
determines a set point of the discharge air temperature;
determines a first operating mode based on the measured discharge air temperature and the set point;
operates the variable speed compressor and the fixed speed compressor based on the determined first operating mode;
determines a second operating mode;
modulates a speed of the variable speed compressor relative to the fixed speed compressor based on the measured discharge air temperature and the set point; and
maintains the discharge air temperature within about 1° F. above the set point and about 1° F. below the set point.

15. The system according to claim 14, wherein the discharge air temperature is maintained within about 0.5 to about 1° F. above the set point and within about 0.5 to about 1° F. below the set point.

16. The system according to claim 14, wherein the fixed speed compressor includes a plurality of fixed speed compressors that include a first fixed speed compressor and a second fixed speed compressor.

17. The system according to claim 16, wherein the controller operates the first fixed speed compressor, the second fixed speed compressor, and the variable speed compressor at one of a plurality of operational stages, the plurality of operational stages being different, the plurality of operational stages corresponding to an operational state.

18. The system according to claim 17, wherein the plurality of operational stages include a first operational stage and a second operational stage, wherein a portion of the first operational stage and a portion of the second operational stage overlap.

19. The system according to claim 18, wherein the overlap provides a continuous capacity control having no stage gap between the plurality of stages, the overlap being set based on a dynamic buffer value expressed as a percentage.

20. The system according to claim 19, wherein the overlap is represented by the first operational stage plus the dynamic buffer value representing a higher capacity than a minimum capacity in the second operational stage.

* * * * *